(12) United States Patent
Axelrod

(10) Patent No.: US 6,585,888 B2
(45) Date of Patent: Jul. 1, 2003

(54) AQUARIUM FILTER SYSTEM WITH INTERCHANGEABLE FILTER CARTRIDGES

(75) Inventor: Glen Axelrod, Colts Neck, NJ (US)

(73) Assignee: T.F.H. Publications, Inc., Neptune City, NJ (US)

(*) Notice: Subject to any disclaimer, the term of this patent is extended or adjusted under 35 U.S.C. 154(b) by 0 days.

(21) Appl. No.: 09/872,729

(22) Filed: Jun. 1, 2001

(65) Prior Publication Data

US 2002/0179512 A1 Dec. 5, 2002

(51) Int. Cl.⁷ .................... A01K 63/04; B01D 27/00; B01D 29/56
(52) U.S. Cl. ............... 210/169; 210/232; 210/335; 210/416.2; 210/420; 210/424; 119/259; 119/260
(58) Field of Search .................. 210/169, 232, 210/282, 314, 335, 416.2, 418, 420, 421, 424; 119/259, 260, 261

(56) References Cited

U.S. PATENT DOCUMENTS

| | | | | |
|---|---|---|---|---|
| 3,669,297 A | * | 6/1972 | Willinger | 210/169 |
| 3,757,739 A | * | 9/1973 | Whitener | 119/224 |
| 4,113,616 A | * | 9/1978 | Kaes | 210/169 |
| 4,678,568 A | * | 7/1987 | Goldman et al. | 210/169 |
| 4,713,173 A | * | 12/1987 | Goldman et al. | 210/169 |
| 4,842,727 A | | 6/1989 | Willinger et al. | 210/169 |
| 4,880,549 A | | 11/1989 | Willinger et al. | 210/805 |
| 5,062,950 A | | 11/1991 | Shieh | 210/86 |
| 5,084,175 A | * | 1/1992 | Hoffmeier | 210/344 |
| 5,087,357 A | | 2/1992 | Villa | 210/169 |
| 5,098,585 A | | 3/1992 | Woltman et al. | 210/778 |
| 5,236,581 A | | 8/1993 | Perry | 210/130 |
| 5,427,683 A | * | 6/1995 | Gershon et al. | 210/264 |
| 5,514,280 A | | 5/1996 | Logan | 210/617 |
| 5,632,887 A | * | 5/1997 | Gargas et al. | 210/151 |
| 5,728,293 A | | 3/1998 | Guoli et al. | 210/151 |
| 6,165,355 A | | 12/2000 | Coulonvaux et al. | 210/131 |
| 6,210,567 B1 | * | 4/2001 | Takada | 210/169 |
| 6,254,769 B1 | * | 7/2001 | Whittaker | 210/95 |
| 6,357,392 B1 | * | 3/2002 | Ido | 119/252 |
| 6,361,715 B1 | * | 3/2002 | Reznik | 252/374 |

FOREIGN PATENT DOCUMENTS

WO    WO 01/70369    * 9/2001

* cited by examiner

Primary Examiner—David A. Simmons
Assistant Examiner—Fred Prince
(74) Attorney, Agent, or Firm—Grossman, Tucker, Perreault & Pfleger, PLLC

(57) ABSTRACT

An aquarium filter system comprising a pump, a manually positionable valve assembly, and one or a plurality of interchangeable filter cartridges. The filter cartridges are interchangeable and replaceable without the need to suspend water flow. The filter cartridges may be readily repositioned relative to their location from the pump. In method form, a method of changing filter cartridges in an aquarium filter is disclosed. The method comprises supplying a pump and pumping water to provide a continuous flow of water from the aquarium to one or a plurality of removable filter cartridges. This is followed by isolating any one or plurality of the filter cartridges from the flow of water and replacing any one or plurality of filter cartridges with one or a plurality of unused filter cartridges. This is all accomplished under conditions such that the continuous flow of water is uninterrupted.

11 Claims, 6 Drawing Sheets

| POSITION | OPERATION |
|---|---|
| P1 | ALL FILTERS IN SERIES |
| P2 | BY PASS FILTER 1 |
| P3 | BY PASS FILTER 2 |
| P4 | BY PASS FILTER 3 |

200
AQUARIUM FILTER SYSTEM WITH INTERCHANGEABLE FILTER CARTRIDGES

FIELD OF THE INVENTION

The present invention relates generally to an aquarium filter system, and more particularly to a filter system having one or more replaceable filter cartridges which can be replaced without turning the system off. The cartridges individually and independently provide biological, chemical and/or particulate filter of the aquarium environment. The system includes a valve assembly capable of by-passing any of the filter cartridges to simplify removal and replacement.

BACKGROUND OF THE INVENTION

Filters have been used in aquariums for many years to remove particulate matter from the aquarium water in order to keep the aquarium clean. Traditionally, the most common type of aquarium filter is a power filter which hangs on the outside of the aquarium over the top edge thereof. It includes a siphon tube which carries water from the aquarium into a filter box. Water entering the filter box flows over various types of filter media to remove particulate matter from the water. The water passes through filter carbon to remove chemical impurities from the water which is then pumped back into the aquarium using a filter pump. Examples of such power filters include the Supreme Aqua King power filter marketed by E. G. Danner Manufacturing Co.; the Second Nature Whisper power filter marketed by Willinger Bros. Mfg. Co.; and the Aqua Clear power filter marketed by Rolf Hagen Manufacturing Co.

Another type of aquarium filter is a canister type filter which may be positioned outside and below the aquarium. Intake and output hoses hang over the aquarium edge and are connected to the canister filter on the floor. Water is fed by gravity through the intake hose from the aquarium to the canister. The aquarium water is both mechanically and chemically treated and pumped back into the aquarium by a pump contained in the canister. Examples of canister type filters include the Hagen Fluval filter marketed by Hagen USA Mfg., Co., Marine Land Canister Filter marketed by Aquaria, Inc., and Eheim Classic Canister Filters, marketed by Eheim GmbH & Co. KG.

An internally mounted power filter is still another type of aquarium filter. Such a filter comprises a small canister with a built-in pump which is submerged inside the aquarium. Water enters the bottom of the canister and flows through a filter sleeve which removes particulate and chemical waste. The filtered water is then pumped out the top of the canister and back into the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2". Air lines from an external pump are placed in the riser tubes to the bottom plate and an air stone is placed at the end of the air lines. Air is forced by the pump through the air stones thereby forcing air bubbles to travel up through the tubes to the water surface creating turbulence or current. Water is then pulled through the gravel and forced up the riser tubes. Waste from the aquarium is drawn through the gravel bed where bacteria break down any ammonia or nitrites to less harmful nitrates. A biological filter does not, however, remove chemical wastes. Examples of such undergravel filters include filters marketed by Perfecto Mfg. and Penplex Mfg.

Yet another type of prior art filter commonly used in aquariums is a wet/dry trickle type filter which includes a skimmer box that hangs inside the aquarium at the top. Siphon tubes are provided for carrying water from the aquarium to a prefilter which is mounted directly behind the skimmer box on the outside of the aquarium. Water passes through foam sleeves in a pre-filter to trap particulate matter. The water then travels through the hose in a tank typically positioned beneath the aquarium. As water enters the tank beneath the aquarium, it flows onto a drip plate or spray bar in a dry chamber of filters which contains a plurality of plastic biospheres. Water drips over and through the biospheres to the bottom section of the tank. Bacteria colonies grow on all biospheres which feed on waste products in the water passing over them. From there, the water gathers in the bottom of the filter tank and then passes through a carbon filter or other filter to remove chemical wastes from the water. The water is then passed through dolomite, crushed coral or crushed clam shells to buffer the water which is then pumped through the return hose back to the aquarium. Wet/dry filters can include mechanical, chemical and biological filters. Examples of such filters are the Plus Series trickle filter marketed by Oceanic System, Inc. and the Perfecto Wet/Dry filtration system sold by Perfecto Mfg. Co.

Wet/dry filters may also be built into the aquarium and form a permanent part of the tank. One such wet/dry filter that is permanently built into the tank is marketed by Tenecor Corporation of Tempe, Ariz.

An alternative form of the wet/dry filter is an internally mounted wet/dry filter which includes an integrated pump and heater for small aquariums. The filter is placed inside the aquarium against the rear wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area. One such filter is marketed by Rolf Hagen Mfg. under the trademark "Biolife" filter.

As should be clear from the above, proper and continuous filtration is critical to keeping happy, healthy fish, and there are three basic filtration methods: mechanical, biological and chemical. However, one long-standing problem is, e.g., that while freshly charged filter media accomplish their intended goals, over time, they tend to loose efficiency.

For example, mechanical filtration, the means by which large particles of excess food and other debris are removed, screened, or skimmed from the water, may become clogged over time, reducing their ability to function as intended. Chemical filtration uses activated carbon and ammonia absorbents, such as zeolite, to remove odor, colors and harmful substances, such as ammonia, from the water. However, activated carbon will also loose its effectiveness over time and will similarly need replacement.

In addition, while replacement of mechanical and chemical filtration is ultimately necessary, careful attention must be placed upon the primary means of removing ammonia and nitrites (by-products of fish waste), which is the biological filter. A well-established aquarium is a natural ecosystem in which fish and the beneficial bacteria that naturally occur in an aquarium depend upon each other to live happily and healthy. The result of this interrelationship is commonly referred to as the "Nitrogen Cycle". Fish eat and produce ammonia as a waste product. Excess food and plant materials also decay and produce ammonia. Beneficial bacteria neutralize the ammonia and produce nitrites, which in turn are neutralized by other beneficial bacteria that produce nitrates. Nitrates in normal levels are harmless to freshwater fish, and over time, can be readily removed from the aquarium by partial water changes. Thus the natural system in an aquarium converts toxic ammonia into harmless nitrates; all without chemicals or consumer assistance.

Expanding upon the above, there clearly needs to be a place for the bacteria to foster and grow within the filter system. It turns out that bacteria will grow on any porous surface in the filter assembly, e.g., on the media in a canister filter that pumps a steady flow of water for the bacteria to survive. That is, the water must be oxygenated as the bacteria require oxygen to reproduce and grow. An aquarium with proper aeration of the water and good water flow over the beneficial bacteria will provide sufficient oxygen to maintain the beneficial bacteria. And, of course, there must be a source of food (ammonia) for the bacteria. Any tank with fish or plants will provide sufficient food. The filtration system then circulates the ammonia carrying water over the beneficial bacteria for them to eat.

Once established, the bacteria inside, e.g., the canister filter assembly are clearly invaluable and critical for a successful aquarium. However, as noted, the need to remove and regularly exchange portions of the filter (chemical and mechanical media) is also necessary. However, when exchanging mechanical and chemical media, it is important to do so in a manner that would not totally disrupt the biological filter media, which could lead to catastrophic results.

That being the case, aquarium filtration technology has not yet developed a filter assembly system that would allow the hobbyist a convenient way to exchange portions filter media without disrupting water flow. More specifically, aquarium filtration technology has not yet provided a canister filter assembly comprising one or a plurality of cartridges, that could each be conveniently removed and exchanged for new media while maintaining regular water flow and minimized impact on the biological filter bed.

Accordingly, it is an object of this invention to provide a filter system that can be mounted to or near the aquarium that has one or more particulate, biological and/or chemical filter cartridges that can easily be replaced. It is also an object of the invention to provide a filter system that allows the user to replace any of the filter cartridges without having to shut the entire system down, and without repriming the system when completed, and without affecting other filter cartridge sections, and without getting wet in the process.

SUMMARY OF THE INVENTION

In broad aspect, the present invention comprises an aquarium filter system comprising a pump, a manually positionable valve assembly, and one or a plurality of interchangeable filter cartridges, said filter cartridges interchangeable without the need to suspend water flow. The filter cartridges may be readily repositioned relative to their location from the pump.

In method form, a method of changing filter cartridges in an aquarium filter is disclosed. The method comprises supplying a pump and pumping water to provide a continuous flow of water from said aquarium to one or a plurality of removable filter cartridges. This is followed by isolating any one or plurality of the filter cartridges from said flow of water and replacing said one or plurality of filter cartridges with one or a plurality of unused filter cartridges. This is accomplished under conditions such that the continuous flow of water is uninterrupted by the practice of isolating and replacing said one or plurality of filter cartridges with said one or plurality of unused filter cartridges.

More particularly, the present invention comprises a device for directing the flow of water from an aquarium through or around a plurality of filters and back into the aquarium. The device comprises a first diverter moveable between a first and a second position, in the first position the flow of water from the aquarium enters a first filter and in the second position the flow of water from the aquarium by-passes the first filter. The device also includes a second diverter moveable between a first and a second position, in the first position, the flow of water from the aquarium enters a second filter and in the second position the flow of water from the aquarium by-passes the second filter, wherein the second diverter is moveable between the first position and the second position independent of the first diverter.

The present invention also provides a device for directing the flow of water from an aquarium through or around a plurality of series coupled filters and back into the aquarium. The device comprises a first diverter moveable between a first and a second position, in the first position, the flow of water from the aquarium enters a first filter and in the second position the flow of water from the aquarium by-passes the first filter. The device includes a second diverter moveable between a first and a second position, in the first position, the flow of water from the aquarium enters a second filter and in the second position the flow of water from the aquarium by-passes the second filter. The device also includes a positionable actuator, the actuator coupled to the first and the second diverters, the actuator moveable between at least three positions, in the first position, the aquarium water is directed through the first filter and the second filter, in the second position, the aquarium water is directed around the first filter and through the second filter, and in the third position, the aquarium water is directed through the first filter and around the second filter.

BRIEF DESCRIPTION OF THE DRAWINGS

The above and other objects and advantages of the present invention will become readily apparent by reference to the following description when considered in conjunction with the accompanying drawings, wherein.

DETAILED DESCRIPTION OF THE PREFERRED EMBODIMENTS

Figure 1:
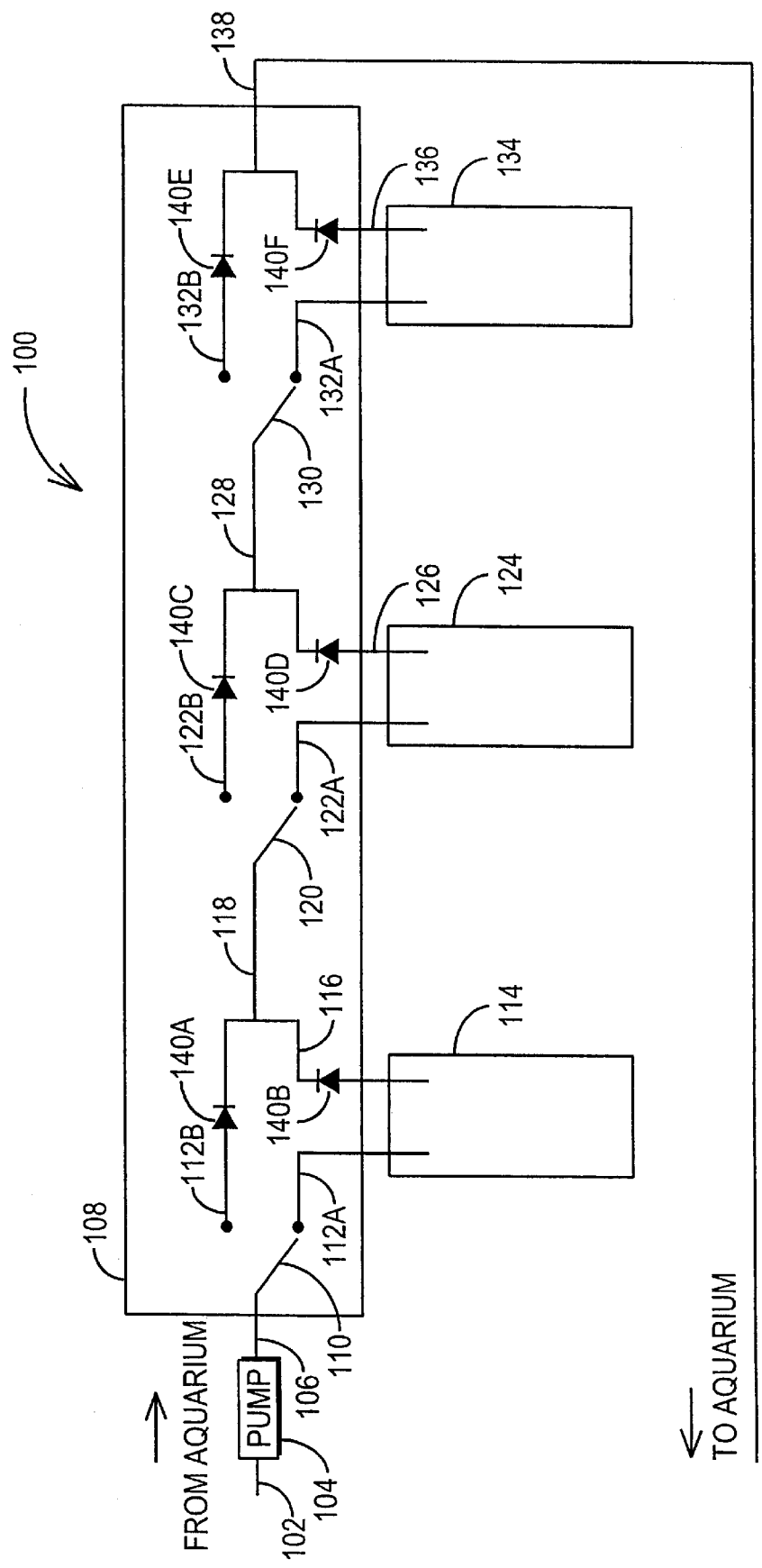
FIG. 1 is a schematic of an aquarium system consistent with the present invention.

FIG. 1 shows a basic schematic of an aquarium filter system 100 in accordance with the present invention. Water to be filtered exits an aquarium through a pipe or conduit 102. The water is urged into to the filter system by a pump 104. The pump may be located before, after, or internal to a valve assembly 108. The water to be filtered leaves the pump through a conduit 106 and enters the valve assembly 108. The direction of the water may be controlled by a series of controllable diverters 110, 120, and 130. In the embodiment shown, the number of filter shown is three, the quantity of filter cartridges can be increased or decreased without departing from the invention. The filters may comprise a particulate, biological, and a chemical filter and may be positioned in any order. The first controllable diverter 110 can direct the water into a first filter 114 or around the filter. In a first position, the diverter directs the water through a conduit 112A to the first filter 114 for filtering. The water exits the filter 114 through a conduit 116 that joins with a conduit 118. In the second position, the diverter 110 directs the water through a by pass conduit 112B, and not through the first filter 114, which joins with conduit 118. In the second position, the filter 114 can be removed without allowing a continuous stream of water to exit the valve assembly 108. The water may be prevented from flowing backwards through the system by either using one-way or backflow valves 140A–F or by proper design of the valve assembly as will be shown below.

Water enters the second controllable diverter 120 through the conduit 118. The second diverter 120 can direct the water into a second filter 124 or around the filter. In a first position, the diverter directs the water through a conduit 122A to the second filter 124 for mechanical, chemical or biological filtering. The water exits the filter 124 through a conduit 126 that joins with a conduit 128. In the second position, the diverter 120 directs the water through a bypass conduit 122B, and not through the second filter 124, which joins with conduit 128. In the second position, the filter 124 can be removed without allowing a continuous stream of water to exit the valve assembly 108.

Water enters the third controllable diverter 130 through the conduit 128. The third diverter 130 can direct the water into a third filter 134 or around the filter. In a first position, the diverter directs the water through a conduit 132A to the third filter 134 for filtering. The water exits the filter 134 through a conduit 136 that joins with a conduit 138. In the second position, the diverter 130 directs the water through a by pass conduit 132B, and not through the third filter 134, which joins with conduit 138. In the second position, the filter 134 can be removed without allowing a continuous stream of water to exit the valve assembly 108. The water returns to the aquarium through the conduit 138. A heater for maintaining the water at a predetermined temperature is not shown. The heater can be installed in series with the valve assembly 108 or separately. The valve assembly 108 may be housed in a housing 108A or 108B.

Figure 2A:
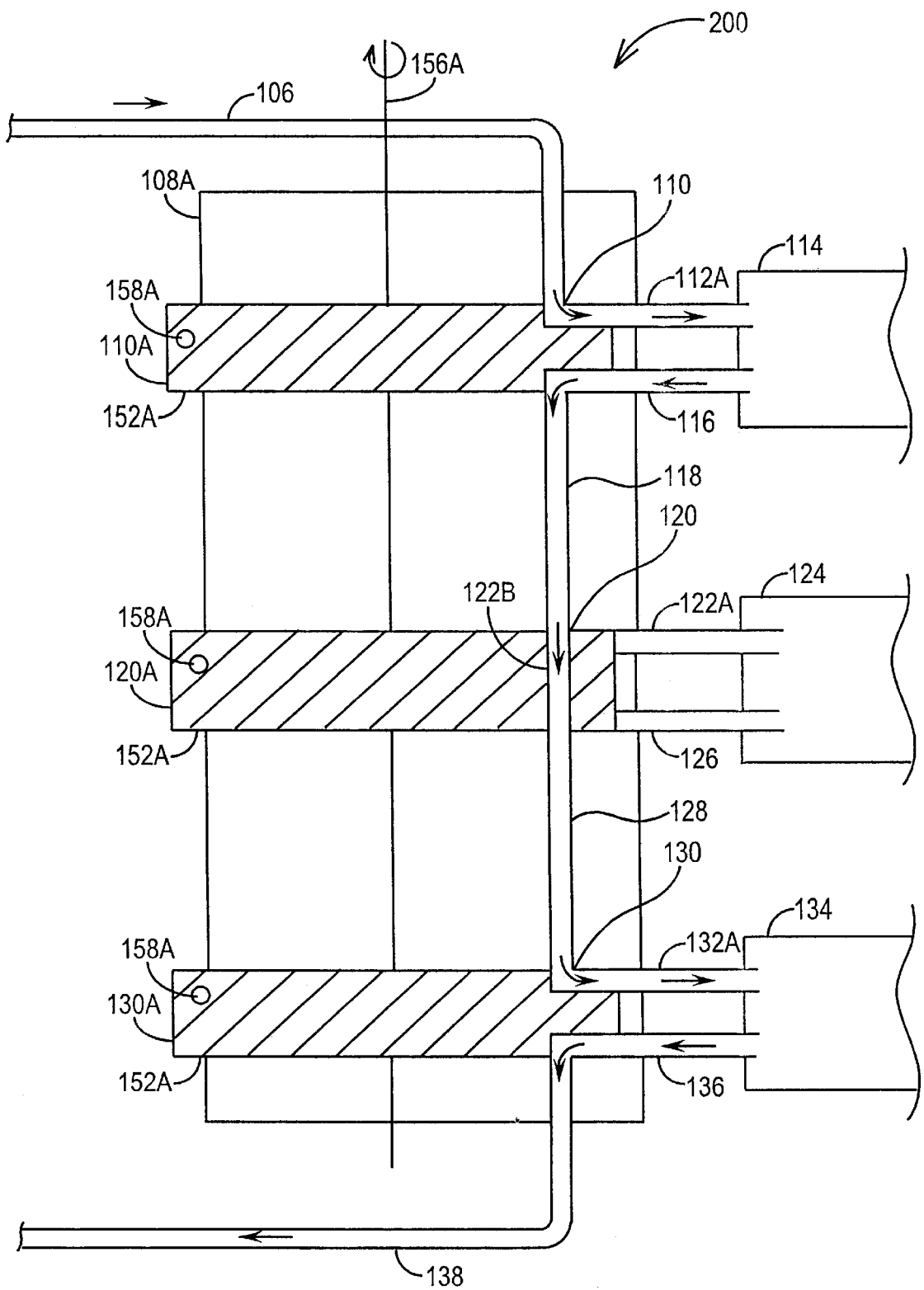
FIG. 2A is a sectional view of a first embodiment valve assembly consistent with the present invention.

FIG. 2A shows a sectional view of a first embodiment valve assembly 200 coupled to a plurality of filter cartridges. The valve assembly and the cartridges can be coupled to a side of an aquarium or in close proximity. The valve assembly 200 may comprise a plurality of individually positionable diverters 110A, 120A, and 130A. Gaskets, not shown, may be used around the diverters to prevent water leaks. A portion 152A of the diverters may extend outside the valve assembly housing 108A to allow a user to reposition the diverter between or among a plurality of positions. The diverters 110A, 120A, and 130A are shown as rotatable disks that rotate about an axis 156A. Alternatively, the diverters can be linearly positionable. The first diverter 110A is shown in a "filtering" position. The incoming water is directed by the first diverter 110A into the first filter 114 through the conduit 112A. The conduit may be made of a rigid or flexible plastic. Alternatively, the first diverter 110A can be positioned in a "bypass" position to allow the water to bypass the first filter 114. Thus no water enters the filter 114. After flowing through the first diverter 110A, the water is directed to the second diverter 120A. The second diverter 120A is shown in the "bypass" position. The second diverter 120A directs the incoming water through a bypass 122B. Thus no water enters the filter 124. Alternatively, the second diverter 120A can be positioned in the "filtering" position to allow the water to enter the second filter 124 through the conduit 122A. After flowing through the second diverter 120A, the water is directed to the third diverter 130A. The third diverter 130A is shown in the "filtering" position. The incoming water is directed by the third diverter 130A into the third filter 134 through the conduit 132A. Alternatively, the diverter 130A can be positioned in the "bypass" position to allow the water to bypass the third filter 134. Thus no water enters the filter 134.

When any of the diverters are in the "bypass" position the corresponding filter can be removed from the filter system without a continuous stream of water exiting the filter system. The diverters may include a visual indicator 158A to indicate to the user if the diverter is in the "filtering" position or the "bypass" position. Because the diverters 110A, 120a, and 130A can be positioned independent of each other, more than one filter can be replaced simultaneously.

As can therefore be appreciated, any one of filters 114, 124 and/or 134 can be isolated from the filter assembly and replaced. In that regard, if, e.g., filter 114 served principally a mechanical filter, and filter 124 principally provided chemical filtration, and filter 134 contained filter media with maximum surface area for beneficial bacteria, filter 114 could be readily removed without adversely effecting the beneficial bacteria of filter 134. In this manner, the hobbyist is now uniquely provided the opportunity to conveniently clean the filter system, in a manner that is not disruptive to the developed biological filter bed, since water flow need not be completely shut-down.

Figure 2B:
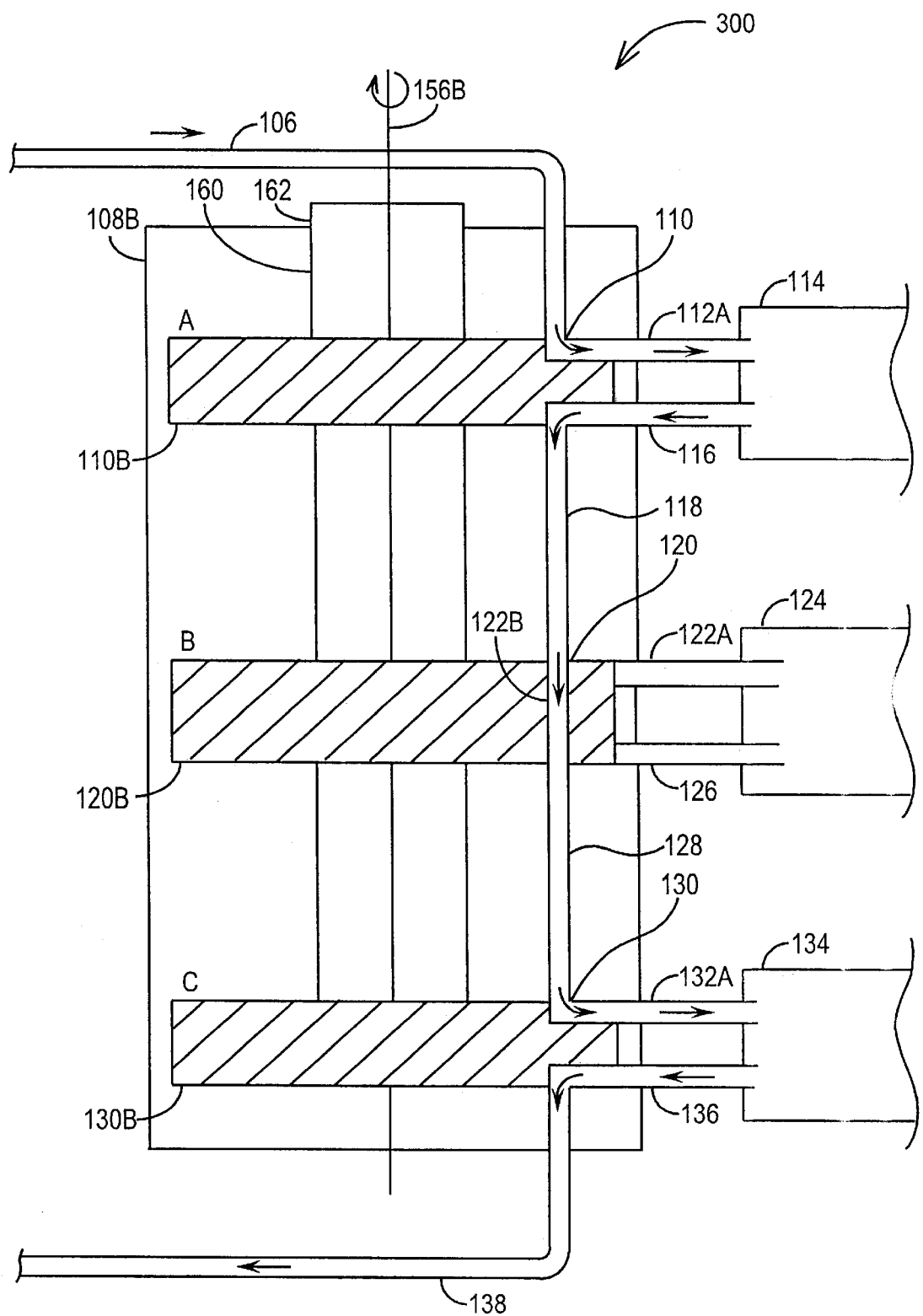
FIG. 2B is a sectional view of a second embodiment valve assembly consistent with the present invention.

FIG. 2B shows a sectional view of a second embodiment valve assembly 300. The valve assembly 300 may comprise a plurality of coupled positionable diverters 110B, 120B, and 130B housed within the valve assembly housing 108B. The diverters 110B, 120B, and 130B may be mechanically coupled through a spindle 160 and move in unison. A portion of the spindle 160 may extend out of the top of the housing 108B and form an actuator 162 for allowing the user to reposition the spindle 160 between or among a plurality of positions. The diverters 110B, 120B, and 130B are shown as rotatable disks that rotate about an axis 156B. Alternatively, the diverters can be linearly positionable. The first diverter 110B is shown in a "filtering" position. The incoming water is directed by the first diverter 110B into the first filter 114. Alternatively, the first diverter 110B can be positioned in a "bypass" position, by rotation of the actuator 162, to allow the water to bypass the first filter 114. After flowing through the first diverter 110B, the water is directed to the second diverter 120B. The second diverter 120B is shown in the "bypass" position. The second diverter 120B directs the incoming water through a bypass 122B. Alternatively, the second diverter 120B can be positioned in the "filtering"

position to allow the water to enter the second filter 124. After flowing through the second diverter 120B, the water is directed to the third diverter 130B. The third diverter 130B is shown in the "filtering" position. The incoming water is directed by the third diverter 130B into the third filter 134. Alternatively, the diverter 130B can be positioned in the "bypass" position to allow the water to bypass the third filter 134.

When any of the diverters are in the "bypass" position the corresponding filter can be removed from the filter system without a continuous stream of water exiting the system. An indicator placed on the actuator 162 on the top surface of the housing 108B can visually indicate to the user which filter, if any, can be removed without causing a loss of water from the system.

Figure 3:
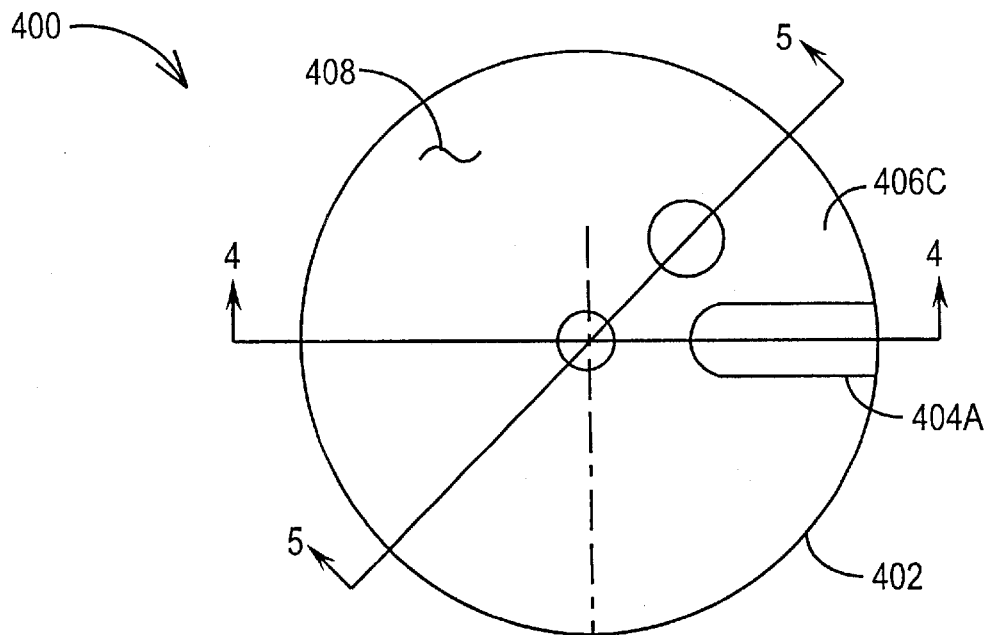
FIG. 3 is a top view of a first embodiment diverter consistent with the present invention.

FIG. 3 shows a top view of a first embodiment of a diverter 400 for use in the valve assembly 200 shown in FIG. 2A. The diverter 400 is shown as a disk 402 having a plurality of openings 404A, 404B and 406C. Opening 404A may start a spaced distance from the central axis of the disk and extend to the edge of the disk 402. A similarly shaped opening 404B may be located on an opposite surface of the disk. The openings 404A and 404B are shown along a top surface 408 and a bottom surface 410 of the disk 402, but may alternatively be positioned a spaced distance below the surfaces as shown in FIG. 4A. Opening 406C may be a through hole that extends from the top surface 408 to the bottom surface 410. The openings 404A and 406 are angularly offset by 45°. The openings can be offset by any angular offset without departing from the present invention. Depending on the size and angular displacement of the openings, the system can maintain the flow of water through the system without having to temporarily interrupt the flow of water as the actuator is repositioned.

Figure 4:
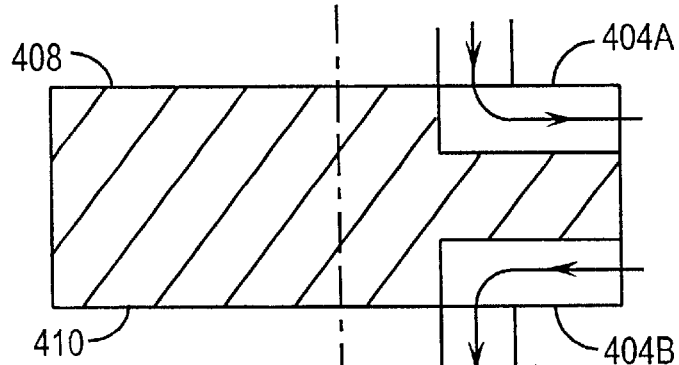
FIG. 4 is a side view of the diverter of FIG. 3 taken through line 4—4.
Figure 4A:
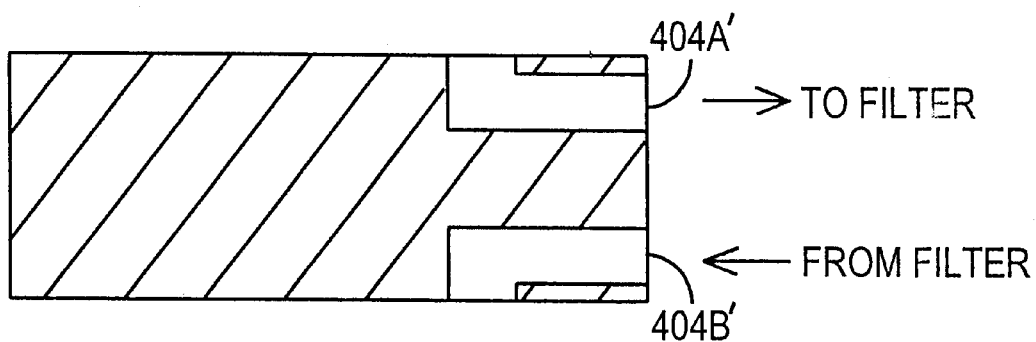
FIG. 4a is a side view of a second embodiment diverter consistent with the present invention.

FIG. 4 is a side view of the diverter 400 of FIG. 3 taken through line 4—4. Water entering the diverter 408 through the opening 404A is direct radially outward towards a filter 114, 124, or 134. Water from the filter 114, 124, or 134 reenters the diverter through the opening 404B and is directed downwardly. When the diverter has the opening 404A aligned with the inlet conduit 106, 118, 128, the water to be cleaned is directed into the filter 114, 124, or 134. When the diverter has the opening 406A aligned with the inlet conduit 106, 118, 128, the water to be cleaned bypasses the filter 114, 124, or 134.

Figure 5:
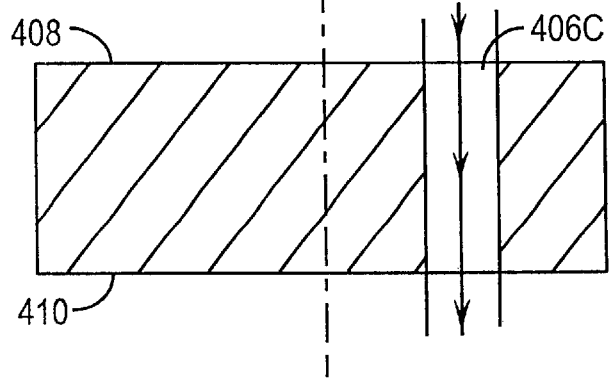
FIG. 5 is a side view of the diverter of FIG. 3 taken through line 5—5.

FIG. 5 is a side view of the diverter 400 of FIG. 3 taken through line 5—5. Water entering the diverter 408 through the opening 406C passes through without entering the filter 114, 124, or 134.

Figures 6, 7:
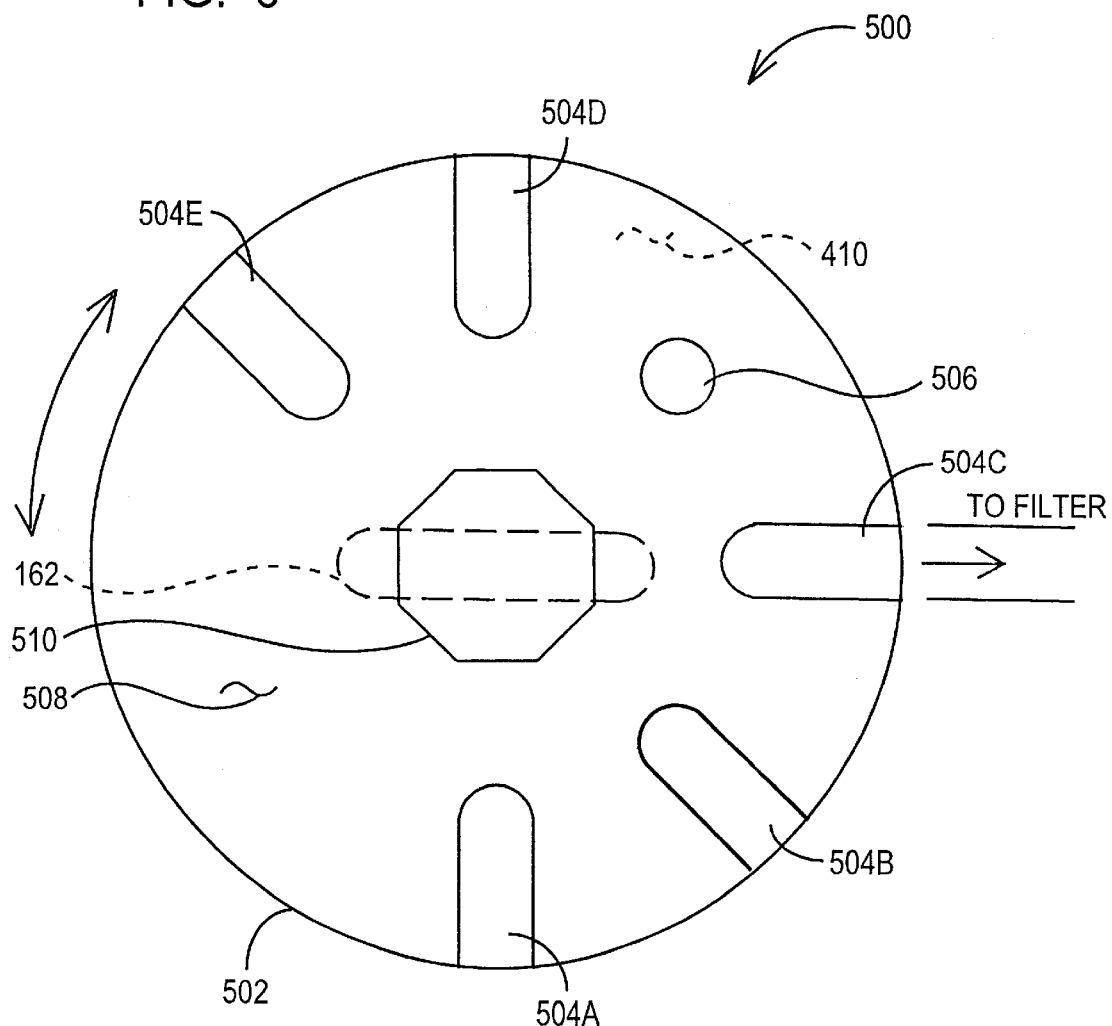
FIG. 6 is a top view of a second embodiment diverter consistent with the present invention.
FIG. 7 is a table relating actuator position of the spindle in FIG. 6 and the corresponding filter function.

FIG. 6 shows a top view of a second embodiment of a diverter 500 for use in the valve assembly 300 shown in FIG. 2B. The diverter 500 is shown as a disk 502 having a plurality of openings 504A–504E and 506. Openings 504 may start a spaced distance from central axis of the disk and extend to the edge of the disk 502. Similarly shaped openings 504A' through 504E' (not shown) may be located on an opposite surface of the disk. The openings 504A–504E are shown along a top surface 508 and corresponding openings 504A'–504E' (not shown) are located along a bottom surface 410 the disk 502, but may alternatively be positioned a spaced distance below the surface similar to FIG. 4A. Opening 506 may be a through hole that extends from the top surface 508 to the bottom surface 510. The opening 504A–504E and 506 are angularly offset by 45°. The openings can be offset by any angular offset without departing from the present invention. The diverter 500 may include a multi-sided opening 510 formed about the diverter axis.

As shown in FIG. 2B, a plurality of diverters may be stacked to form a valve assembly 300. The multi-sided spindle 160 may be inserted through the opening 510 to couple the diverters 110B, 120B, and 130B. The diverter may or may not be spaced from each other as shown in FIG. 2B. The diverter 500 and housing 108A and 108B may be manufactured by injection molding. The same diverter 500 can be used in each of the three locations A, B, and C to form diverter 110B, 120B, and 130B. The diverter 500 when located in location A can be coupled to the spindle 160 at a first angular position relative to the actuator 162, the diverter 500 when located in location B can be coupled to the spindle at a second angular position relative to the actuator 162, and the diverter 500 when located in location C can be coupled to the spindle at a third angular position relative to the actuator 162.

FIG. 7 is a table relating the angular position of the actuator 162 and the corresponding filter function. When the actuator 162 is positioned in the first angular position P1, all of the filters are connected in series. Opening 504C is aligned with conduit 106, which directs the water in to the first filter 114, opening 504B is aligned with conduit 118, which directs the water in to the second filter 124, and opening 504A is aligned with conduit 128, which directs the water in to the third filter 134.

When the actuator 162 is positioned in the second angular position P2, filter 114 is by passed and filters 124 and 134 are connected in series. Opening 506 is aligned with conduit 106, which directs the water around the first filter 114, opening 504C is aligned with conduit 118, which directs the water in to the second filter 124, and opening 504B is aligned with conduit 128, which directs the water in to the third filter 134.

When the actuator 162 is positioned in the third angular position P3, filter 124 is by passed and filters 114 and 134 are connected in series. Opening 504D is aligned with conduit 106, which directs the water into the first filter 114, opening 506 is aligned with conduit 118, which directs the water around the second filter 124, and opening 504C is aligned with conduit 128, which directs the water in to the third filter 134.

When the actuator 162 is positioned in the fourth angular position P4, filter 134 is by passed and filters 114 and 124 are connected in series. Opening 504E is aligned with conduit 106, which directs the water into the first filter 114, opening 504D is aligned with conduit 118, which directs the water into the second filter 124, and opening 506 is aligned with conduit 128, which directs the water around the third filter 134. More openings 504 and 506 may be added to the disk 502 to allow more than one filter to be replaced simultaneously.

In addition, it should be noted that in the broad context of the present invention, it is preferable to provide a unique pathway for the flow of water in the filter, such that backpressure is minimized. For example, it is preferable to construct the filters disclosed herein with a spiral pathway, which increases the surface area for filtration efficiency and which also reduces backpressure, thereby affording additional and unique operating advantages.

It should be understood that, while the present invention has been described in detail herein, the invention can be embodied otherwise without departing from the principles thereof, and such other embodiments are meant to come within the scope of the present invention as defined in the following claim(s)

What is claimed is:

1. An aquarium filter system for filtration of water, comprising a pump, a manually positionable valve assembly comprising a plurality of diverters and a plurality of interchangeable filter cartridges, said filter cartridges interchangeable without the need to suspend water flow wherein said diverters each independently control the flow of water to said filter cartridges such that the system provides filtration of said water through one of said filter cartridges while one of said filter cartridges is replaced.

2. The filter system of claim 1, comprising a plurality of filter cartridges, each of said plurality of filter cartridges in communication and located from said pump, wherein each of said plurality of filter cartridges can be repositioned relative to its location to said pump.

3. The filter system of claim 1 wherein said one or plurality of filter cartridges provides mechanical, chemical and/or biological filtration.

4. The filter system of claim 3 wherein said biological filtration comprises supplying bacteria which consumes ammonia and produces nitrites.

5. The filter system of claim 1 comprising a plurality of filter cartridges in communication and located from said pump, wherein one of said plurality of filter cartridges provides mechanical filtration, one of said plurality of filter cartridges provides chemical filtration, and one of said plurality of filter cartridges provides biological filtration.

6. A device for directing the flow of water from an aquarium through or around a plurality of filters and back into the aquarium, comprising first and second removable filter cartridges and
   (i) a first diverter moveable between a first and a second position, in the first position the flow of water from the aquarium enters said first filter and in the second position the flow of water from the aquarium by-passes said first filter;
   (ii) a second diverter moveable between a first and a second position, in the first position the flow of water from the aquarium enters said second filter and in the second position the flow of water from the aquarium by-passes said second filter, wherein the second diverter is moveable between the first position and the second position independent of the first diverter.

7. The device of claim 6 wherein when the first diverter is in the second position, the first filter can be removed from the device without a continuous stream of water exiting the system.

8. The device of claim 6 wherein the first diverter and the second diverter are substantially enclosed in a common housing.

9. A device for directing the flow of water from an aquarium through or around a plurality of series coupled filters and back into the aquarium, comprising first and second removable filter cartridges and
   (i) a first diverter moveable between a first and a second position, in the first position the flow of water from the aquarium enters said first filter cartridge and in the second position the flow of water from the aquarium by-passes said first filter;
   (ii) a second diverter moveable between a first and a second position, in the first position the flow of water from the aquarium enters a second filter and in the second position the flow of water from the aquarium by-passes the second filter; and
   (iii) a positionable actuator, the actuator coupled to the first and the second diverters, the actuator moveable between at least three positions, in the first position the aquarium water is directed through said first filter and the second filter, in the second position, the aquarium water is directed around the first filter and through the second filter, and in the third position, the aquarium water is directed through the first filter and around the second filter.

10. The device of claim 9 wherein when the actuator is in the second position, the first filter can be removed from the device without a continuous stream of water exiting the system.

11. The device of claim 9 wherein the first diverter and the second diverter are substantially enclosed in a common housing.

* * * * *